US012539245B2

(12) United States Patent
Gomez et al.

(10) Patent No.: US 12,539,245 B2
(45) Date of Patent: Feb. 3, 2026

(54) SURGICAL TABLE TOP ACCESSORY WITH SACRAL OFFLOADING ATTACHMENT

(71) Applicant: Infinitus Medical Technologies LLC, Holly Springs, NC (US)

(72) Inventors: David J. Gomez, Holly Springs, NC (US); Nathan Winder, San Jose, CA (US); Luke Truax, Kaneohe, HI (US)

( * ) Notice: Subject to any disclaimer, the term of this patent is extended or adjusted under 35 U.S.C. 154(b) by 644 days.

(21) Appl. No.: 17/438,733

(22) PCT Filed: Mar. 16, 2020

(86) PCT No.: PCT/US2020/022941
§ 371 (c)(1),
(2) Date: Sep. 13, 2021

(87) PCT Pub. No.: WO2020/205216
PCT Pub. Date: Oct. 8, 2020

(65) Prior Publication Data

US 2022/0125658 A1 Apr. 28, 2022

Related U.S. Application Data

(60) Provisional application No. 62/818,433, filed on Mar. 14, 2019.

(51) Int. Cl.
*A61G 13/12* (2006.01)
*A61G 7/015* (2006.01)

(52) U.S. Cl.
CPC ......... *A61G 13/1285* (2013.01); *A61G 7/015* (2013.01); *A61G 13/127* (2013.01); *A61G 2210/50* (2013.01)

(58) Field of Classification Search
CPC .... A61G 13/123; A61G 13/127; A61G 7/057; A61G 7/05723; A61G 7/00; A61G 7/015; A61G 2200/16; A61G 13/00; A61G 13/08; A61G 13/02; A61G 13/12; A61G 13/1205; A61G 13/121; A61G 13/128; A61G 13/129; A61G 13/1285; A61G 13/1295; A61G 13/101; A61G 7/002; A61G 7/05; A61G 2210/50
USPC ... 5/618, 624, 601, 613, 602, 610, 611, 620, 5/658, 661
See application file for complete search history.

(56) References Cited

U.S. PATENT DOCUMENTS

| | | | | | |
|---|---|---|---|---|---|
| 3,041,121 | A * | 6/1962 | Comper | A61G 13/00 | 5/618 |
| 3,281,141 | A * | 10/1966 | Smiley | A61G 13/00 | 5/618 |
| 2004/0133979 | A1* | 7/2004 | Newkirk | A61F 5/3761 | 5/624 |
| 2007/0214570 | A1* | 9/2007 | Coppens | A61G 13/10 | 5/601 |
| 2015/0135441 | A1* | 5/2015 | Sommer | A61G 13/08 | 5/613 |
| 2015/0157281 | A1* | 6/2015 | Parrish | A61B 6/0442 | 5/601 |

(Continued)

FOREIGN PATENT DOCUMENTS

WO WO-2014096430 A1 * 6/2014 ........... A61B 6/4283

*Primary Examiner* — Justin C Mikowski
*Assistant Examiner* — Deborah Talitha Gedeon
(74) *Attorney, Agent, or Firm* — Phillips Lytle LLP; David L. Principe

(57) ABSTRACT

An improved surgical table top accessory with a sacral offloading attachment.

17 Claims, 14 Drawing Sheets

(56) References Cited

U.S. PATENT DOCUMENTS

| | | | | |
|---|---|---|---|---|
| 2015/0327819 | A1 * | 11/2015 | Aravamudan ....... | A61B 6/0442<br>5/601 |
| 2018/0140493 | A1 * | 5/2018 | Shandas ............. | A61G 13/0081 |

* cited by examiner

SURGICAL TABLE TOP ACCESSORY WITH SACRAL OFFLOADING ATTACHMENT

CROSS-REFERENCE TO RELATED APPLICATION

The present application claims priority benefit of U.S. Provisional Patent Application No. 62/818,433 filed on Mar. 14, 2019, entitled "Surgical Table Top Accessory with Sacral Offloading Attachment" which is incorporated herein by reference.

TECHNICAL FIELD

The present invention relates generally to the field of medical devices, and more particularly to a surgical table top accessory.

BACKGROUND ART

The efficacy of surgical care may be limited today due to the limitations of infrastructure needed to adequately accommodate obese patients. It is well documented that almost forty percent of the adult U.S. population is considered obese, having a BMI greater than 30. The prevalence of obesity was 39.8% and affected about 93.3 million of U.S. adults in 2015-2016.

Currently most surgical tables in the U.S. typically measure about 19.5 to 21 inches in width. The surgical rail system that is designed to hold all of the attachments needed to perform surgical care only span an additional 1.5 inches per side, giving a total rail width of 22.5 to 24. 5 inches.

In clinical practice, the tables may be modified to accommodate all size patients by utilizing modular extension systems that attach to the bed rail. To adequately use these devices, up to eight individual attachments may be required. Very few facilities utilize all of these attachments. The attachments are not very stable due to their loading mechanisms. Most facilities refuse to use the attachments when attaching retractor systems or stirrups used to support the legs as they can be heavy and generate significant mechanical stresses related to their function. U.S. Pat. No. 6,678,908 discloses a designed overlay for surgical tables. The system disclosed in the patent does not account for the need for radiology or X-ray surgical tops needed for intraoperative diagnostics where X-ray cartridges or digitizers are placed under the table top.

Another common issue faced by the health care industry is the mechanical stresses and shearing involved when heavy patients are positioned in a certain way such as the lithotomy or legs up surgical position. Sacral pressure injuries are becoming more prevalent due to these forces.

The current surgical table design utilizes a cutout at the end of the middle torso section of the table. The purpose for the cutout is for surgeons to gain perioperative access to the perineal area, including the male/female sex organs and the rectal space. In practice, patients must be picked up and moved to this area. It is common for providers to place the patients too far off the table as they are trying to accommodate for skin and adipose elasticity that must be considered, when tilting patients head down in angles approaching forty to forty-five degrees. At these angles, the movement of the body, while secured at the base point of the mattress pad to the patient, including any surgical positioning devices utilized will still shift due to movements of adipose and skin elasticity. This movement may be exaggerated the higher the center of gravity is displaced from where the patient comes in contact with the table or a surgical positioning device. The surgical mattress also plays a role in the potential for injury as there is no standard for pressure relief from surgical mattress to surgical mattress or from manufacturer to manufacturer. The mattresses differ based on pad cost and level of padding selected.

While the layers needed to offload some of the forces may be improved through better mattress designs, the weakest point of any structure is the corner of the mattress which is where the patient's sacral area rests. When a patient is placed head down and the legs are placed upwards in stirrups, the mechanical force combined with the patient weight collapses the mattress top at the lateral corners of the mattress which increases the risk for sacral tissue injury as the sacrum is pressed against the underlying hard table structure.

BRIEF SUMMARY OF THE INVENTION

With parenthetical reference to the corresponding parts, portions or surfaces of the disclosed embodiment, merely for the purposes of illustration and not by way of limitation, the present invention provides a surgical table top accessory with a sacral offloading attachment.

In one aspect of the invention an expanded radiology riser is made of phenolic or carbon fiber material for mounting on a surgical table that has an inclusive stable bed rail design, made of stainless steel, carbon fiber, or aluminum alloys. The expanded riser serves to mimic the underlying footprint of the rail configuration of the preexisting table top to provide the width needed to comfortably fit larger patients to the surgical table top. Table widths can vary from 24-30 inches plus an additional 2 inches of outward rail width needed to support heavy infrastructures like bed rail affixed retraction system and stirrups.

In another aspect, expanded riser plates are added to any section of the existing surgical table based on a model that needs expansion. Sometimes there is a need to expand just the two areas of the torso section needed to support gynoid and android adult anatomies. This configuration provides significant clearance in areas of the expanded body tissue as it relates to stirrups and fixed post retraction, where lateral clearance of tissue and hard objects are rarely considered in design. This evolves with an expanding adult obesity epidemic that currently stands at 42% per the CDC.

In yet another aspect of the invention, a standard radiology riser of normal 19.5 to 21 inch width is provided with an expanded width accessory line having a width of 24-30 inches with a radiopaque receiver block included. The system is used with a sacral offloading utility designed to reduce tissue herniation at the traditional table cutout, thus reducing the risk of mattress collapse and patient tissue interacting with the underlying hard top structure of the table or radiology riser.

In another aspect of the invention, the receiver block holds and locks a sacral offloading system to a standard size radiology riser top. The sacral offloading system is designed in both reusable and disposable versions to allow the surgeon to manipulate the end of the table for customized exposures to the perineal area and the rectum which is needed for gynecological and colorectal surgical procedures, or any other procedure requiring access to this area. The system-offloads the sacral tissue area in a way that reduces injury and herniation through the typical cutout designs of existing tables when the lithotomy surgical position is required. The combination of the cutout, along with poor corner support of mattress padding, and the weight of legs in stirrups that serve to drive the pelvis and sacrum downward into the table, will be vastly improved to reduce injury with the design of the present invention.

In an aspect of the invention, the design will include a receiver block, and disposable or reusable combination of mini-cell foam, EBV foam, EVA/Polyolefin, or similar foam. The foam is cut and supported with cold flexible aluminum or cable locking utilities designed to be easily manipulated via the surgeon for access to the perineum and sacral area. The foam flexes, and is topped with another layer of disposable foam of equal density of the existing mattresses, while also included version of gel, air, Newtonian based fluids for force dispersion and cycling via rheostatic/electrical means, sound, or internal plastic motor haptic vibrations needed to change the density of fluid from semi liquid to liquid states and back thus allowing changes in regional vascular compression and offloading to decrease pressures typical of tissue, nerve, and vascular injuries.

In another aspect of the invention, the radiology riser models include a variation that introduces an imbedded or removable patient weight supportive radiological digitizer plate that can either be accessed via Bluetooth or via USB to deliver a digital image to existing radiological platforms and fluoroscopy platforms when anterior/posterior radiological images are required for surgical care. This system improves the current utility of surgical tables, especially over the pedestal and base, where traditional C-arm radiological products cannot be placed. This embodiment allows the upper portion of the C-arm (X-ray source) to interact with the riser's digitizer, replacing the X-ray detector (lower portion of the C-arm), when anterior/posterior views are needed, while allowing slight transverse imaging to a varied degree based on size of patient and the digitizer plate.

In another aspect of the invention, a radiological riser attaches to the existing structure of surgical tables by means of a series of straps or embedded anchor points needed to keep the table stable during lateral unloading and offloading of patients in respect to footprint of existing table underneath. This securing apparatus may include reusable or disposable S-hook or J-hook straps that tighten the table to existing standard bedrail structure. Fixed aluminum, carbon fiber, or stainless steel fixation anchors may align to the existing tail structure or table top. One version may include a lock nut system with expansion at the distal end that would be received into the existing table top with slight aftermarket modifications that would pose no utility or safety concerns to the manufacturer's existing table design.

In an aspect of the invention, an expanded width riser and standard riser replacement with receiver block also includes an evolved mattress option designed specifically for obese patients, and to account for the effect of gravity dependent changes and mattress weight gravity dependent weight distribution. This mattress has supported zone density coverages designed to offload and provide support based on weight and bony prominence distribution such as the heels, the sacral and scapular areas, and the posterior skull. Corners are reinforced to reduce collapse at critical areas such as the perineal cut out. In the event the block and sacral support system is not used for lithotomy based surgical procedures, the mattress includes standard polyurethane foams, and a new "pneumatic" polyurethane foam that unlike viscoelastic or gel based foams, provides greater support, especially in cold environments like the operating room, as typical "memory type foams" only offload pressure without support, and when cold, are more firm and even hard until warmed up with the patient's temperature. When gel is infused into foam, the "glass effect" is a normal phenomenon, as colder temperatures reduce the viscosity of the viscoelastic gels, making them harder. This requires patient's temperature to warm the mattress to allow offloading support.

In surgical environments of 60-72 degrees, these types of mattresses fail to warm effectively as many products are placed between the mattress and the patient, including surgical positioning devices, RF reader systems to reduce retained instruments, under body warming and cooling systems, and grounding pads. Each system has varying layers of physical density characteristics that reduce natural conductive warming of the mattress with the patient's body heat, thus increasing the risk of skin and tissue injury.

The mattresses of the present invention do not include a top "memory foam" layer typical of existing mattresses, and operate in temperature from 50-100 degrees with no change in physical characteristics or viscosity, thus assuring stable offloading and support pressure.

Versions of the mattress include polyurethane gels that respond to lower temperatures with less viscosity changes, and Newtonian fluid technologies that change physical fluidity through electronic, vibration (internal haptic motors), and sound waves. The system constantly changes the mattress in relation to the pressure of the patient, providing a series of indirect pressure improvements constantly through a programmed grid that is based on nonlinear geometric activation. This system assures that all areas of the Newtonian fluid provide constant loading and offloading support without a fixed algorithm. This organic Newtonian fluid is also radiopaque, and contained within the layer of the mattresses core, as to not be subject to puncture or leaking.

In another aspect of the invention, filaments of organic or micro gauge wiring run into the matrix of the fluid in a square pattern, thus allowing for the best configuration of activation geometry possible. Other versions include mini motors for vibration and soundwave geometries needed to activate the fluid into a semi fluid to supportive state. These mattress may be linked via magnetic conduits or tethers that readily release from the other mattress sections (typically 3-4) to minimize damage tearing, and improve decontamination. Small motors and even pressure sensors to control the pattern of force dispersion can be generated through a program, a small module, or even through a phone application via Bluetooth, zigbee, or other form of communications compliant to hospital IT protocols.

In yet another aspect of the invention, readily changeable plates and mattress tops are provided. The configurations may be customized for the patient based on the patient's anatomy or based on surgical procedures required for advanced surgical platforms that require lithotomy, supine, prone, lateral patient positions, as well as omnidirectional rotation of the surgical table in any axis.

DESCRIPTION OF THE PREFERRED EMBODIMENTS

Figure 1:
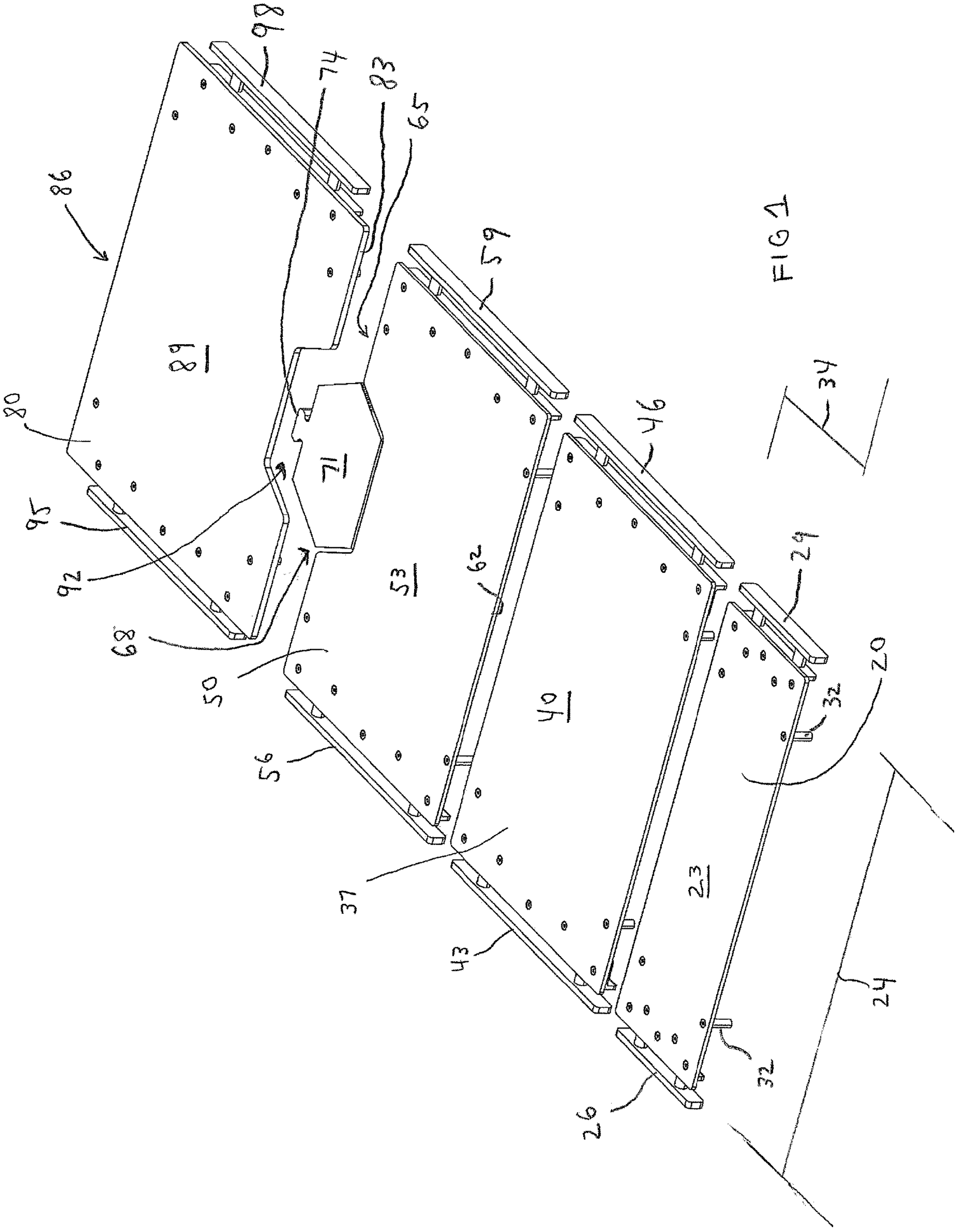
FIG. 1 is a top perspective view of a table top accessory system with a sacral loading attachment of the present invention.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms “horizontal”, “vertical”, “left”, “right”, “up” and “down”, as well as adjectival and adverbial derivatives thereof, (e.g., “horizontally”, “rightwardly”, “upwardly”, etc.), simply refer to the orientation of the illustrated structure as the particular drawing figure faces the reader. Similarly, the terms “inwardly” and “outwardly” generally refer to the orientation of a surface relative to its axis of elongation, or of rotation, as appropriate.

All surgical tables have an x-ray table top utility required to load x-ray cartridges and digitizers under the patient in the event radiographic views are needed to diagnose, look for retained instruments, or the like. The x-ray table top utility typically rises 1 to 1.5 inches above the table and are attached by means of insertion pins that are screwed into the x-ray top. The user aligns the pins and sets them into the fixed surgical table top. Typically these risers are also only 19.5 to 21 inches wide because they must not extend over the fixed surgical rails mounted on the table as many attachments still need to be placed on the surgical table rail.

The present invention provides for converting the existing 19.5 to 21 inch wide surgical table into a stable and supportive table top structure, custom made to fit each manufacturer’s surgical table configuration. According to the present invention a 26 inch wide table top may be inserted onto standard radiology pins in order to convert into tables designed for obese patients in place of standard x-ray risers. The system has its own bed rail configuration similar to the foot print of the standard table which is inset about four inches. This configuration allows the table to be used as intended when it comes to accommodating larger patients safely and when using standard bed rail attachments and accessories. The riser of the present invention may be constructed of carbon fiber or phenolic material and also encapsulate or allow the use of digitizing X-ray plates commonly used for radiographic diagnostics. The user is able to place a digitizer within the structure of the table top via a flush design pocket embedded within the structure, or have them embedded within the structure and either sent through a wireless means (WIFI) or have a plug in port in the riser plate to interact with digital X-ray systems. The system may also be provided with a conductive link or some type of radiolucent warming system embedded into the frame to allow passive head conduction to the patient through the mattress, as warming patients in the operating room is critical for safe anesthesia and surgical management. The rails are integrated into each plate section of the riser, as described in more detail herein, to allow providers to use only the portion of the surgical table they need to expand separately or as one unit to compensate for larger patients.

The riser system adds a sacral offloading utility for both the obese table top accessory plate system and for the standard 19.5 to 21 inch wide X-ray surgical table tops. The obese table top accessory plate system may be constructed of phenolic material or carbon fiber plates to support patients up to one thousand pounds while maintaining the stability of the table top and patient when the patient must undergo moderate degrees of omnidirectional bed rotation. The system may be locked onto the table via the lower standard bedrails via straps, fasteners, or an evolving line of tethering utilities designed to keep the system stable. For much larger patients, table tops wider than 26 inches may also be provided. A j-hook assembly may be used to secure larger table tops to the existing surgical rail spacer for added stability.

The sacral offloading area is a padded extension of the sacral plate. This area allows providers to adjust the device to visualize the perineal space, while providing stable and constant support of the sacral area. This configuration eliminates the corner collapse and potential for the sacrum to be forced against the hard table structure.

The sacral wedge goes into a receiver block located on the surgical table top or the xray/obese table top. The user is able to manipulate the angle of deflection by either releasing a tension wire within a flex arm to loosen and adjust, or use flexible aluminum rods. This configuration allows full support of the sacrum as the mattress or separate pad attachment is attached to underlying and malleable structure.

This configuration also allows providers to move their patients less, as its common for providers to lift and mover patient to the end of the torso plate for lithotomy 7-14 inches. Most move them too far and others not enough, this configuration allows them the adjust the sacral offloading system enough to gain access yet still provide adequate support to the sacral area vs collapsing the corner of the mattress against the fixed table structure.

The table top also has additional bio-mechanoid repositioning attachments specific to the table to improve patient handling and positioning processes.

Figure 2:
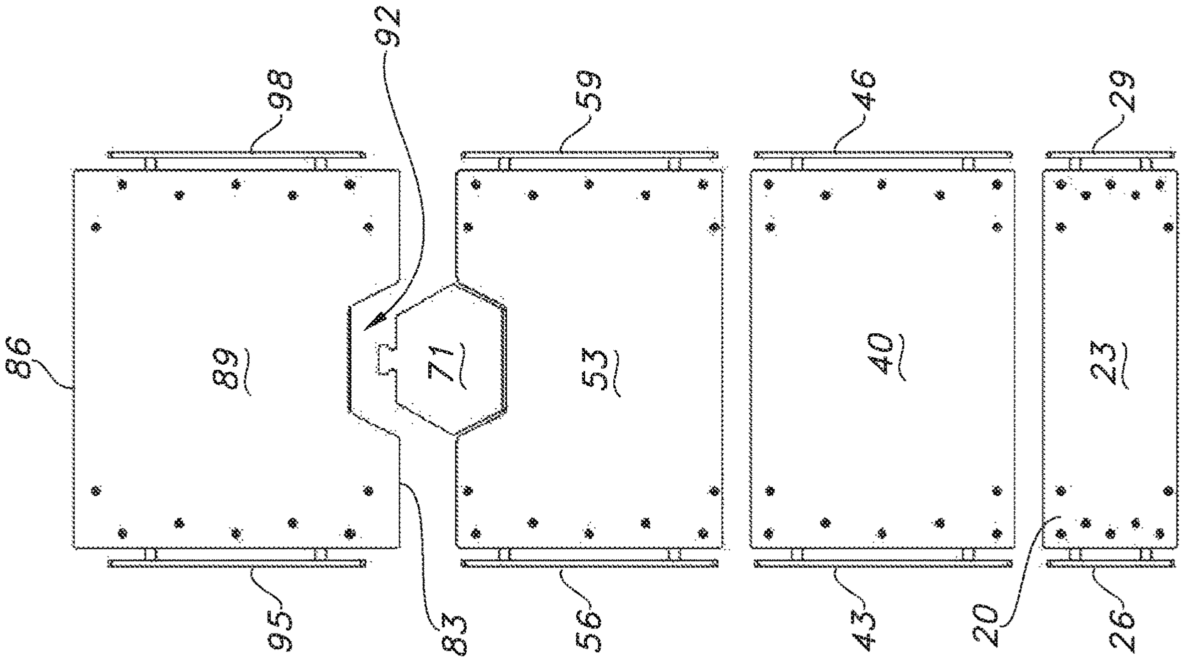
FIG. 2 is a top plan view of the table top accessory system of FIG. 1.

Referring generally to FIGS. 1-15 of the drawings, and initially to FIGS. 1-2 thereof, this invention provides a first riser panel 20 having a patient support surface 23. The patient support surface 23 may be substantially planar and have a width 24 of twenty four to thirty inches. The panel 20 may be provided with rails 26, 29 disposed on opposite sides of the panel 20. The panel 20 may be provided with pins 32 extending downward and substantially perpendicular to the orientation of the support surface 23. The panel 20 may have a length 34 that is shorter than the remaining panels as will be described in greater detail herein. The panel 20 may be formed from a plenolic material, carbon fiber, or other suitable materials. The panel 20 may be mounted to a standard surgical table by insertion of the pins 32 into openings that are typically used for radiological risers as known to persons of ordinary skill in the art based on this disclosure. The panel 20 may include an imbedded radiological digitizer plate.

A second riser panel 37 may be disposed adjacent to the first panel 20. The second riser panel 37 has a patient support surface 40 that may be coplanar with surface 23. The panel 37 may be provided with rails 43, 46 disposed on opposite sides. The panel 37 may be formed from similar materials as panel 20 and may also include an imbedded radiological digitizer plate. Panel 37 may have a width substantially similar to panel 20 but its length may be greater.

A third riser panel 50 may be disposed adjacent to the second panel 37. The third riser panel 50 has a patient support surface 53 that may be coplanar with support surface 40. The panel 50 may be provided with rails 56, 59 disposed on opposite sides. The panel 50 may have a first end 62 and a second end 65. The second end 65 may have an opening 68 defined therein for receiving a sacral wedge 71.

The sacral wedge 71 may have a six-sided polygonal shape with three sides mating with the opening 68 in panel 50. The sacral wedge 71 may have a protuberance 74 extending therefrom. The sacral wedge 71 is attached to a receiver block 77 (FIGS. 4, 7) as will be described in greater detail herein but is removable therefrom. The sacral wedge 71 is configured so as to be deformable such that it extends downward and outward from the second end 65 of the third panel 50. The panel 50 may be formed from similar materials as the other panels 20, 37 and may also include an imbedded radiological digitizer plate.

A fourth riser panel 80 may be disposed adjacent to the third panel 50. The fourth riser panel 80 has a first end 83 and a second end 86. The fourth riser panel 80 has a patient support surface 89 that may be coplanar with the patient support surfaces on the other panels. The first end 83 may have an opening 92 with three sides to provide clearance for the sacral wedge 71. The panel 80 may be provided with rails 95 and 98 disposed on opposite sides.

The system of the present invention provides a plurality of riser panels that may be added in different combinations depending on the procedure and the patient. The expanded riser plates of the present invention may be added to any section of the existing surgical table based on a model that needs expansion. Sometimes there is a need to expand just the two areas of the torso section needed to support gynoid and android adult anatomies. This configuration provides significant clearance in areas of the expanded body tissue as it relates to stirrups and fixed post retraction, where lateral clearance of tissue and hard objects are rarely considered in design. This evolves with an expanding adult obesity epidemic that currently stands at 42% per the CDC.

Figure 3:
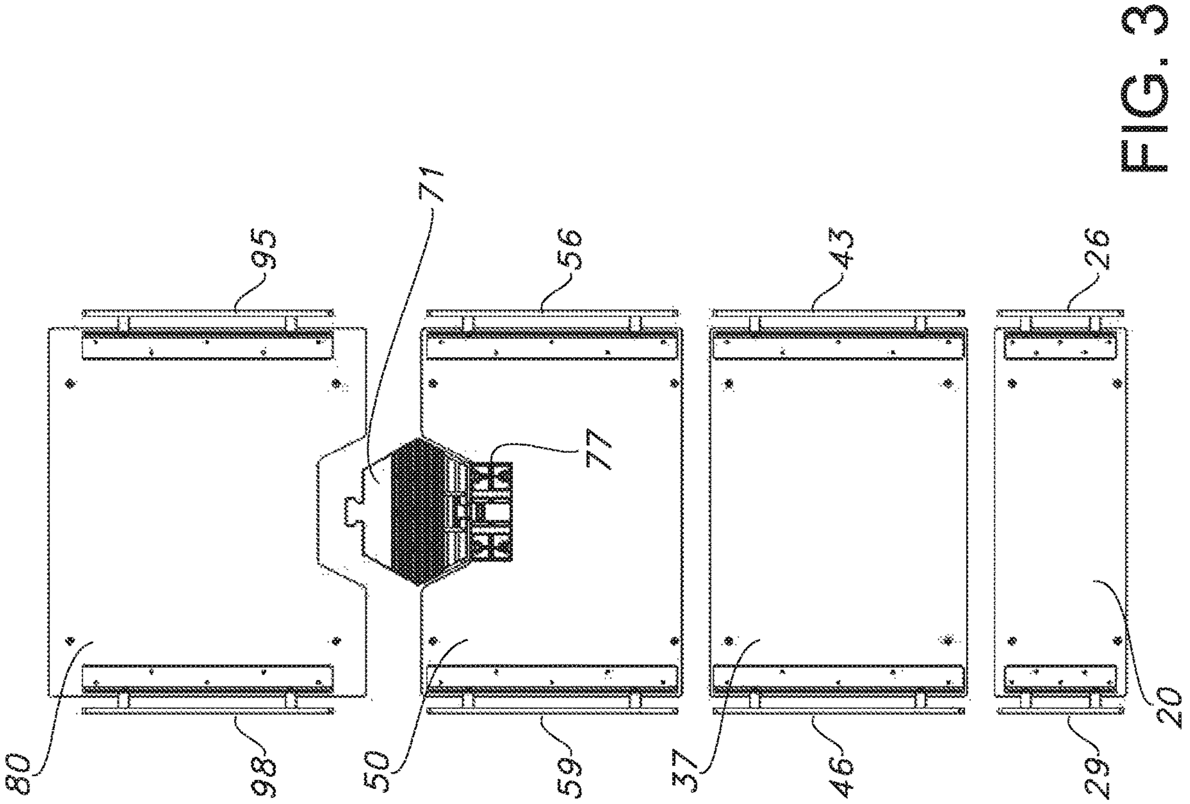
FIG. 3 is a bottom plan view of the table top accessory system of FIG. 1.

Turning to FIG. 3, the underside of the system of the present invention is shown. As will be described in greater detail herein the sacral wedge 71 may be provided with a plurality of elongate openings 130 (best shown in FIG. 10) formed therein to provide for deformation in a downward curve relative to the support surface of the adjacent riser panel. Also shown in FIG. 3, the receiver block 77 may be provided with openings for receiving elongate members extending from the sacral wedge 71. It will be understood by those of ordinary skill in the art based on this disclosure that the elements could be reversed such that the receiver block has elongate member and the sacral wedge has openings. Also, other mechanical arrangements, fasteners or the like may be used to couple the sacral loading attachment to the receiver block on the panel.

Figure 4:
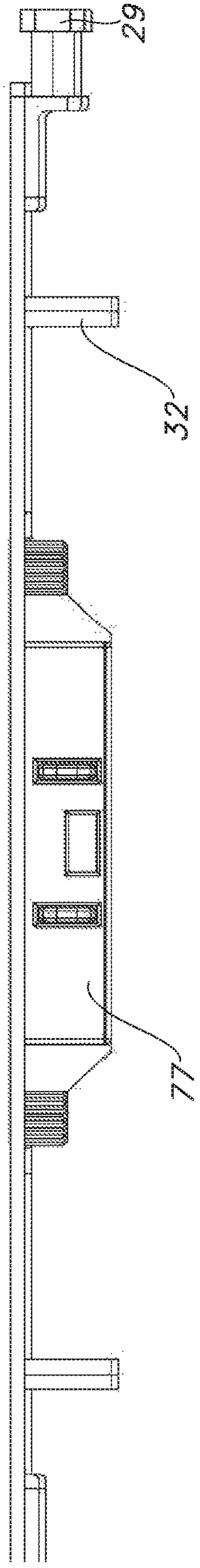
FIG. 4 is front end elevational view thereof.
Figure 5:
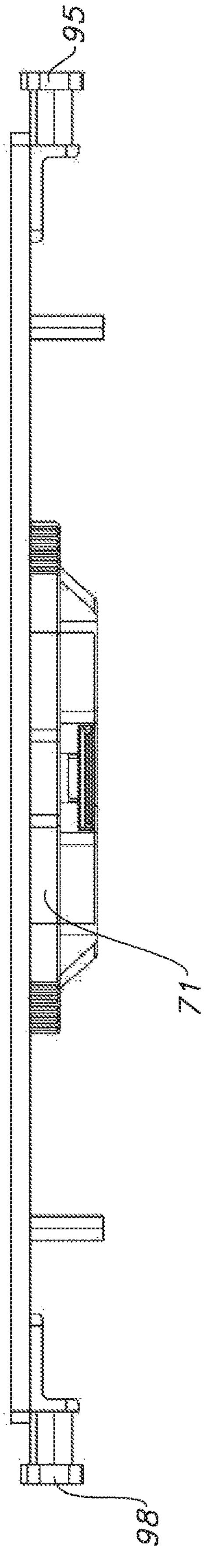
FIG. 5 is a rear end elevational view thereof.

FIGS. 4 and 5 show end views of the system shown in FIG. 1. FIG. 4 shows the engagement of the elongate members inside openings defined in the receiver block. FIG. 5 shows an end view of the sacral attachment or sacral wedge 71.

Figure 6:
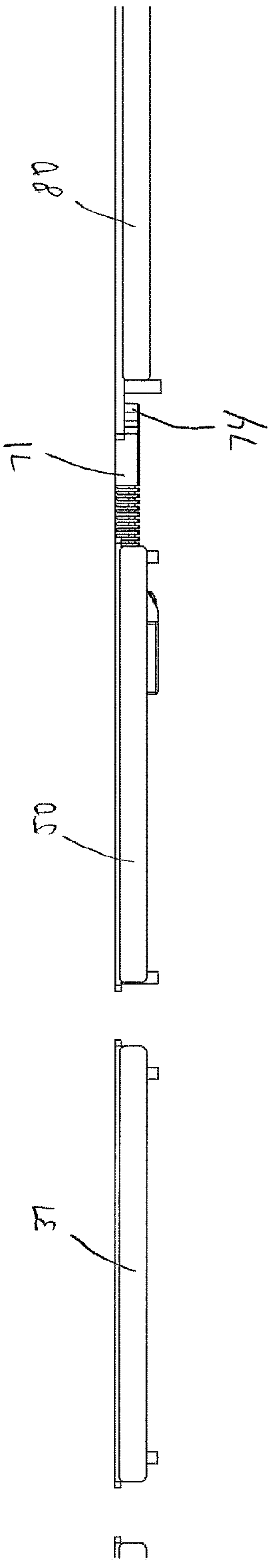
FIG. 6 is a side elevational view thereof.

FIG. 6 shows the protuberance 74 on the end of the sacral wedge 71 extending below the end of the adjacent riser panel 80.

Figure 7:
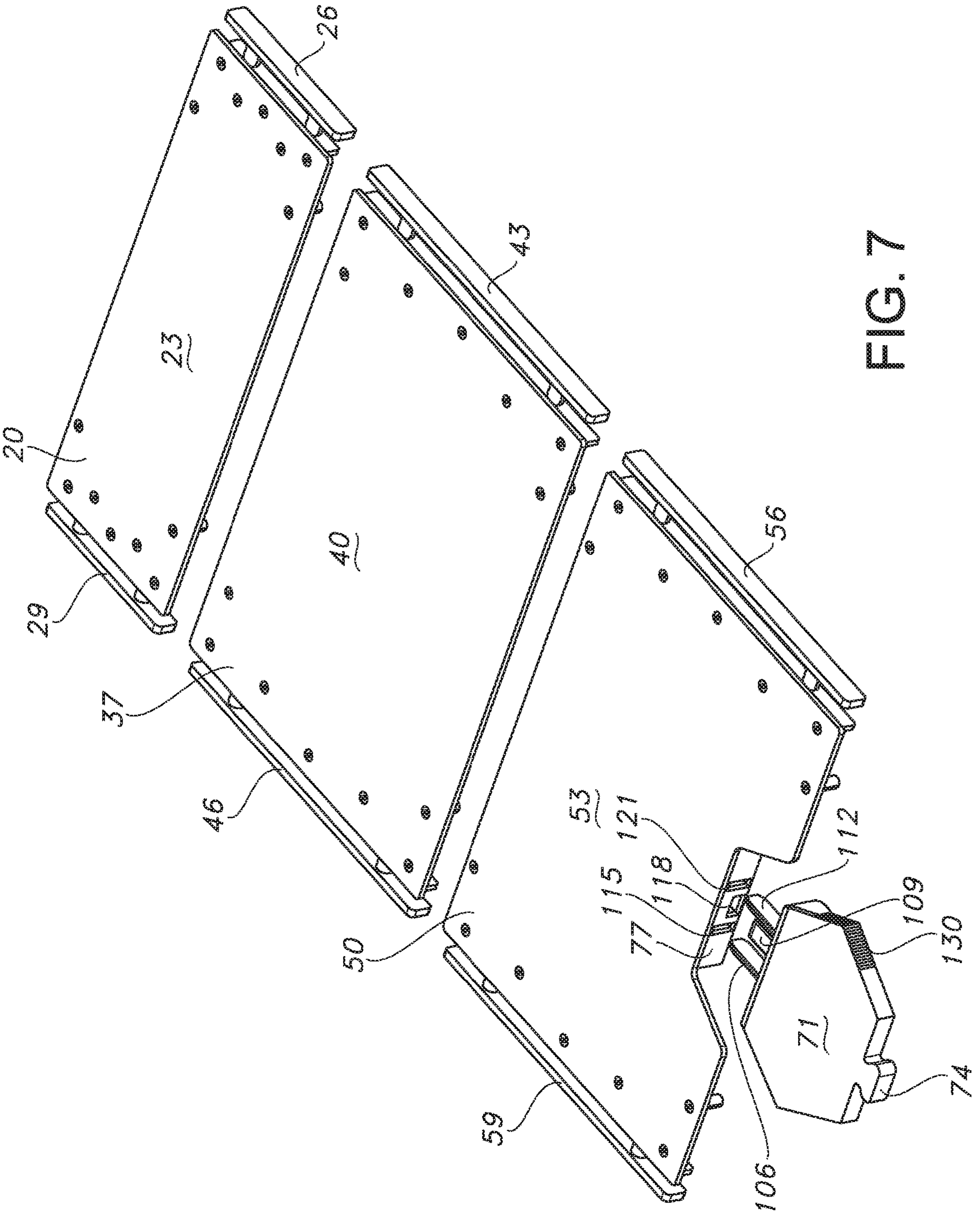
FIG. 7 is a top exploded view of a table top accessory system with a sacral loading attachment.

FIG. 7 provides a detailed view of the sacral wedge 71 including first, second, and third elongate members 106, 109, and 112 extending from one end of the sacral wedge 71. The receiver block 77 has corresponding openings 115, 118, and 121 that are configured to receive the elongate members 106, 109, and 112 in interlocking fashion. Accordingly, the sacral wedge 71 is removably attached to the receiver block 77. As shown, the receiver block 77 is formed integrally in riser panel 50. Alternately, the receiver block 77 may be attached to a riser panel. The protuberance 74 extends from the opposite side of the sacral wedge 71.

Figure 8:
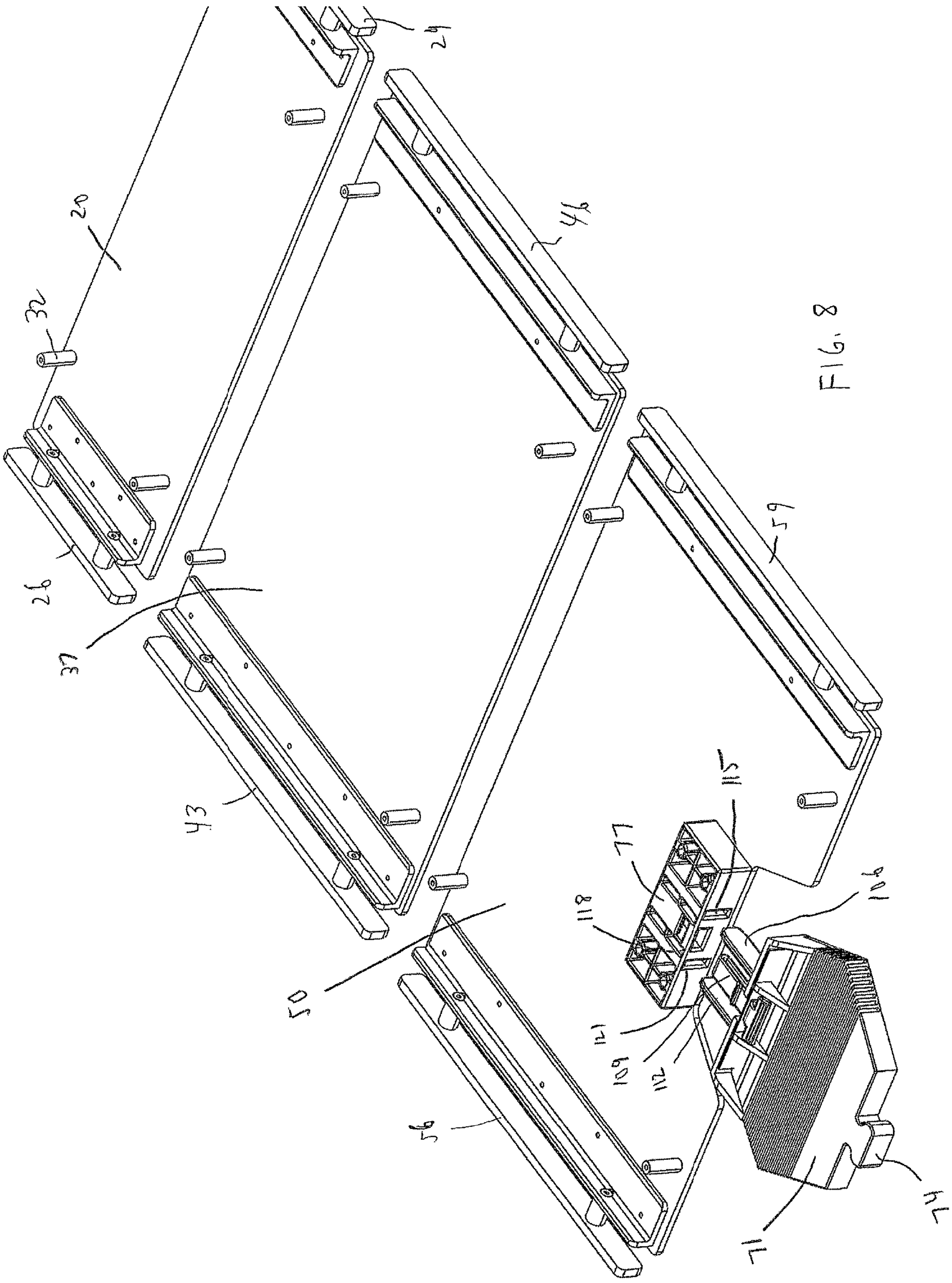
FIG. 8 is a bottom exploded view of the table top accessory system of FIG. 7.
Figure 9:
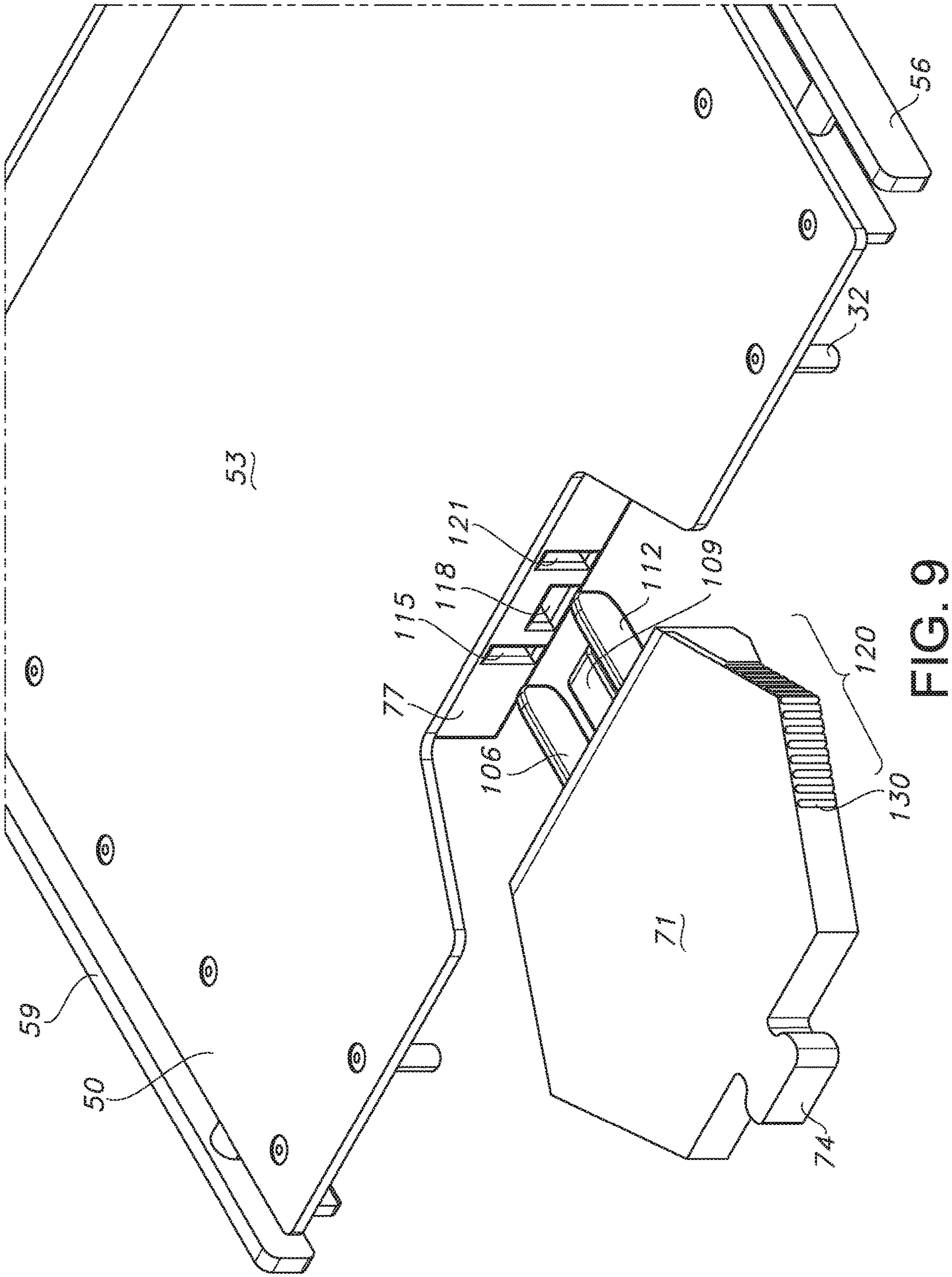
FIG. 9 is an enlarged perspective view of a portion of FIG. 7.
Figure 10:
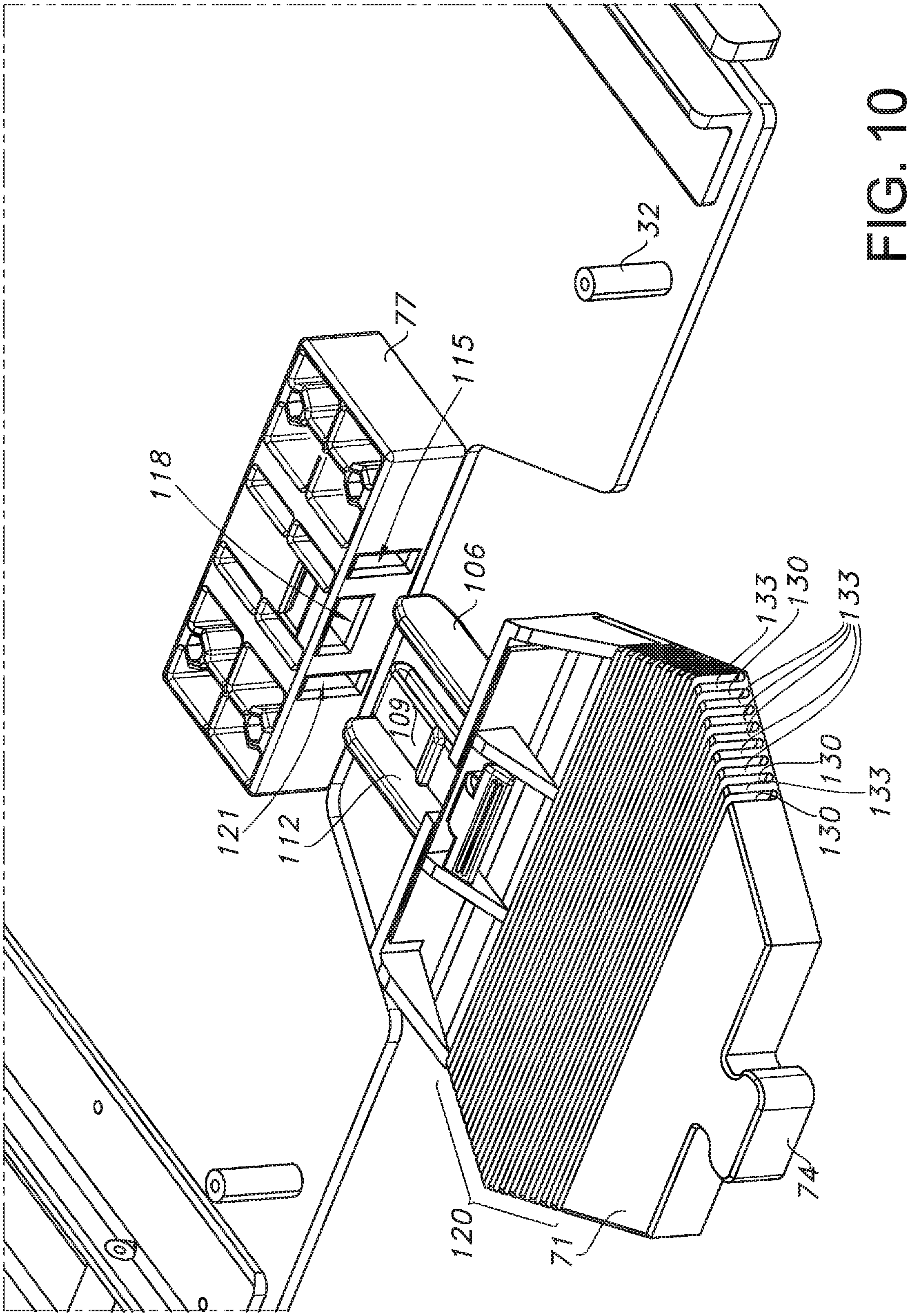
FIG. 10 is an enlarged perspective view of a portion of FIG. 8.

Turning to FIGS. 8-10, the sacral wedge 71 is shown in greater detail. As shown in FIGS. 9-10, a middle portion 120 of the wedge 71 has a plurality of openings 130 either formed integrally or where material has been removed. The openings 130 are elongate and are disposed between finger-like elongate members 133 of the body of the wedge 71 disposed between openings 130. The alternating peaks and troughs form a repeating pattern through a large section of the sacral wedge 71. The openings provide flexibility to the material such that it is capable of deforming such that the sacral wedge 71 curves under a load.

Figure 11:
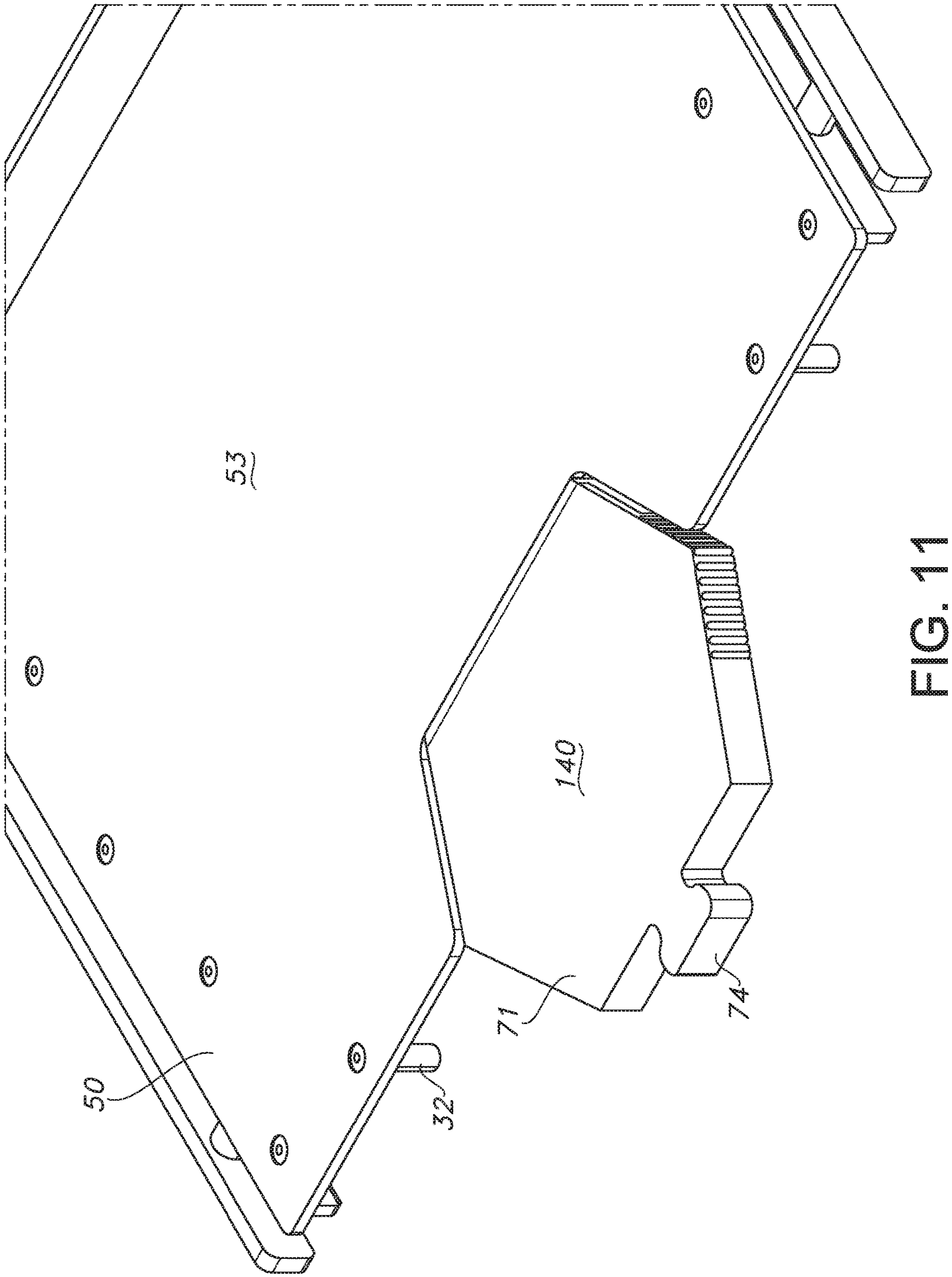
FIG. 11 is an enlarged top perspective view of the table top accessory system with a sacral loading attachment.
Figure 12:
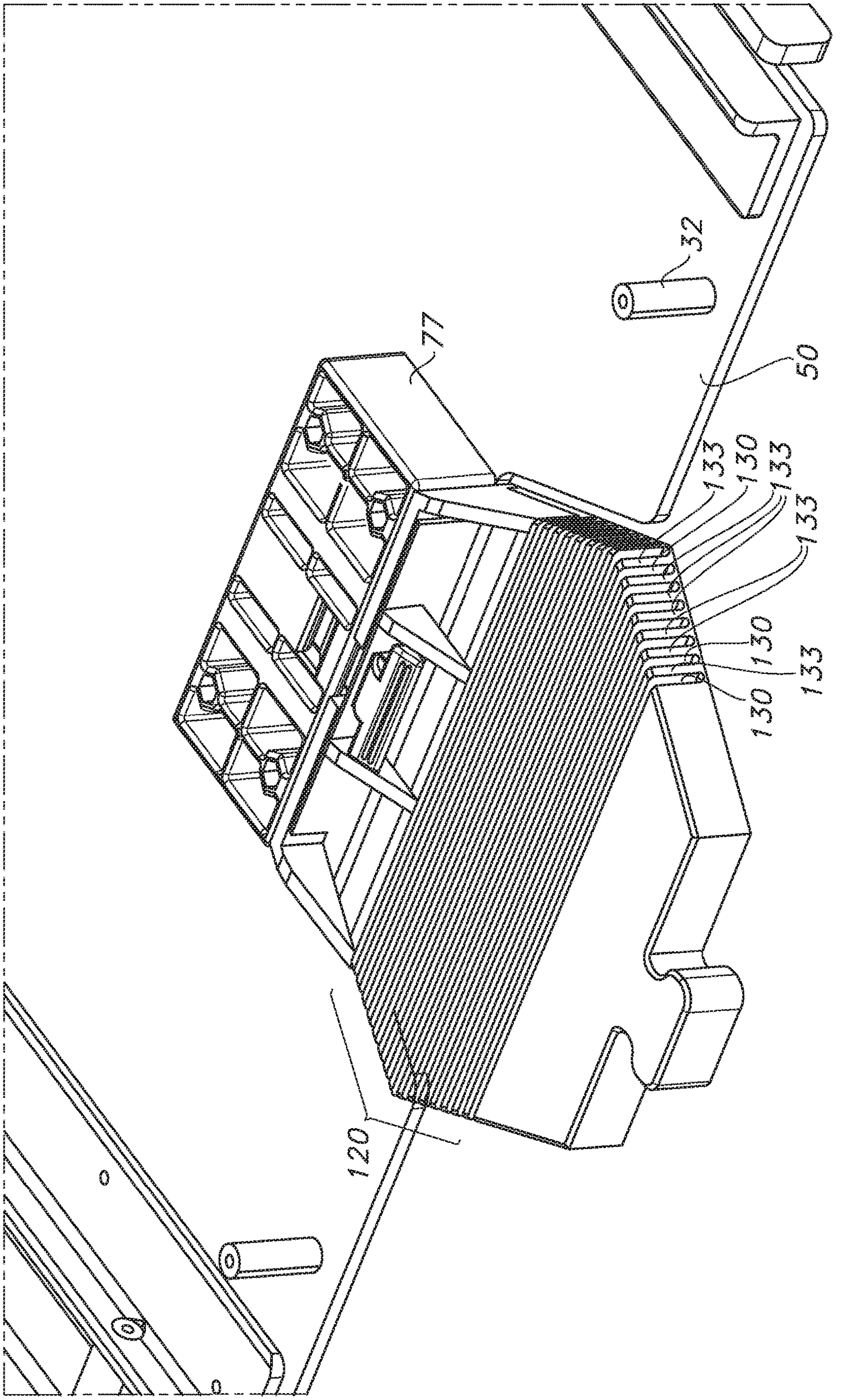
FIG. 12 is an enlarged bottom perspective view of the accessory shown in FIG. 11.

Turning to FIGS. 11-12, the sacral wedge 71 is shown fully engaged with the receiver block 77 such that the wedge 71 is attached to panel 50. The upper surface 140 of the wedge 71 provides support to the sacral area of a patient during medical procedures. The alternating peaks and troughs formed in the mid portion of the wedge 71 provides for the wedge 71 to deform downward under a load.

Figure 13:
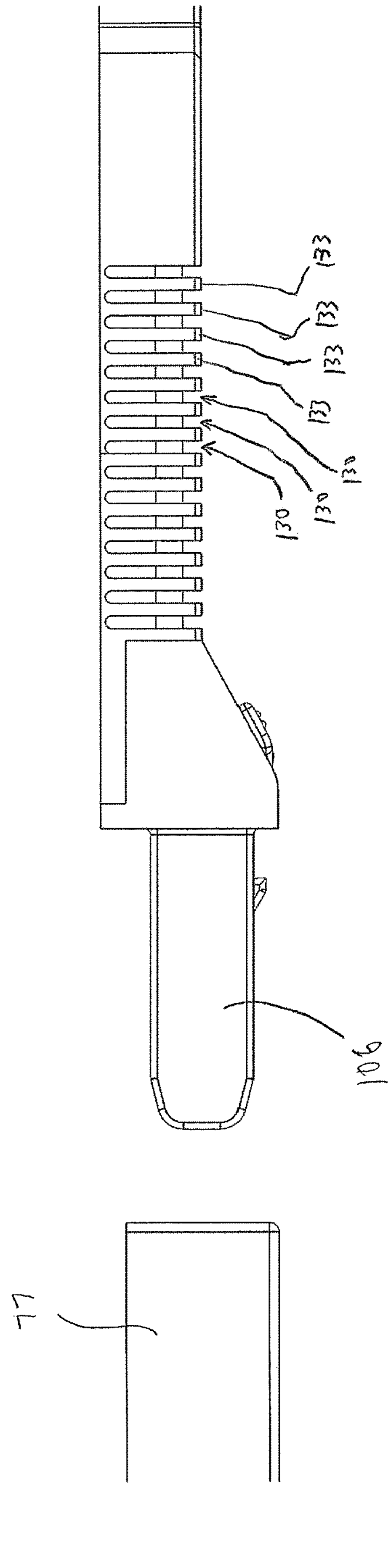
FIG. 13 is a side elevational view of the sacral loading attachment and an adjacent support panel; and, FIG. 14 is a side elevational view showing the sacral loading attachment mated with the panel shown in FIG. 13.
Figure 14:
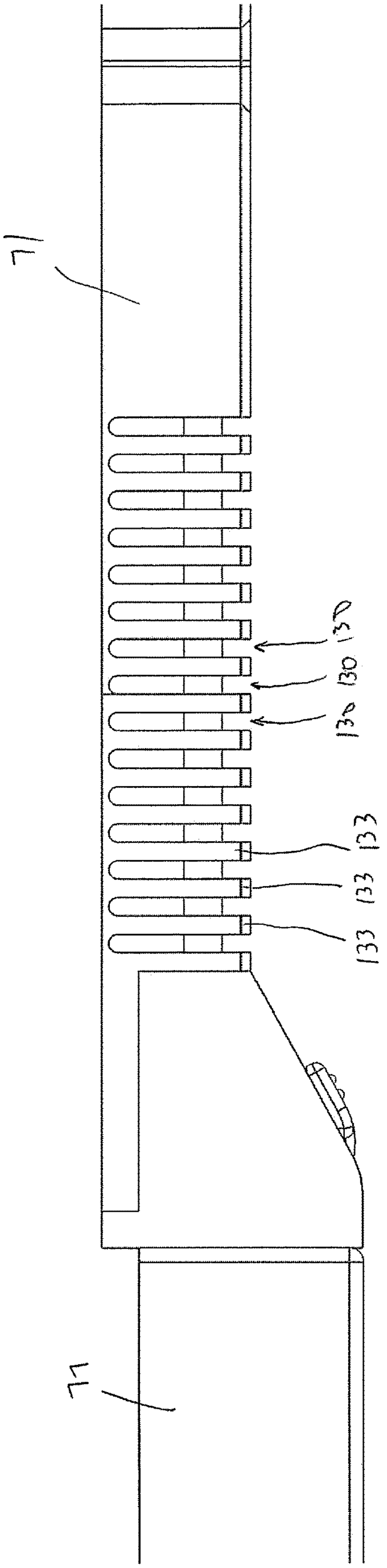

In FIGS. 13-14, detailed views show the sacral wedge 71 prior to and after engagement with the receiver block 77. As shown, the midportion 120 of the wedge 71 has a plurality of elongate members 133 separated by elongate channel-shaped openings 130. The alternating elongate members 133 and channel shaped openings 130 form adjacent peaks and troughs in the material of the sacral wedge 71. The voids may be formed integrally through molding or may be formed by removing material after molding.

In addition to the construction of the sacral wedge 71 with peaks and troughs formed therein, it will be evident to those of ordinary skill in the art based on this disclosure that other mechanical arrangements and methods may also be suitable for providing a sacral attachment that is capable of extending outwardly from a panel and deforming to curve or extend downward under the load of a patient.

In addition to combining the sacral attachment 71 with riser panels, it is also within the present invention to combine the sacral attachment 71 with a receiver block 77 mounted directly to a surgical table. For example, an oversized surgical table may be constructed with a receiver block (attached or formed integrally) or other means for removably attaching a sacral attachment according to the present invention. The surgical table may be provided with patient support panels having embedded digitizer panels formed therein.

The present invention contemplates that many changes and modifications may be made. Therefore, while the presently-preferred form of the surgical table top accessory with a sacral offloading attachment has been shown and described, and several modifications and alternatives discussed, persons skilled in this art will readily appreciate that various additional changes and modifications may be made without departing from the spirit of the invention, as defined and differentiated by the following claims.

The invention claimed is:

1. A riser system for mounting on a surgical table, the surgical table having a support surface, the riser system comprising:

one or more riser panels having a patient support surface, the riser panels mounted above and an in spaced apart relation to the support surface of the surgical table, and, a sacral loading attachment removably attached to the one or more riser panels, the sacral loading attachment having a body defined in part by a plurality of elongate members extending downward along a midportion of the length of the sacral loading attachment, the plurality of elongate members having openings defined between adjacent elongate members, the openings configured to provide space for deformation of the sacral loading attachment under a load along a curve from a proximal end of the top surface of the sacral loading attachment to a distal end of the top surface, the sacral loading attachment being deformable so as to extend outward and downward from the one or more riser panels.

2. The system set forth in claim 1, wherein at least one of the one or more riser panels include an imbedded radiological digitizer plate.

3. The system set forth in claim 1, wherein the one or more riser panels comprises a plenolic radiolucent material.

4. The system set forth in claim 1, further comprising at least one pin configured for engagement with an opening in the surgical table, the at least one pin configured to support the one or more riser panels from the surgical table.

5. The system set forth in claim 1, wherein the one or more riser panels comprises radiolucent carbon fiber.

6. The system set forth in claim 1, further comprising a receiver block disposed on one of the one or more riser panels.

7. The system as set forth in claim 6, wherein the receiver block is radiopaque.

8. The system set forth in claim 6, wherein the sacral loading attachment has one or more elongate members extending therefrom.

9. The system set forth in claim 8, wherein the elongate members on the sacral loading attachment engage with openings in the receiver block.

10. The system set forth in claim 1, wherein the one or more riser panels comprises a plurality of riser panels having different lengths.

11. The system set forth in claim 1, wherein at least one of the one or more riser panels has a bed rail attached thereto.

12. The system set forth in claim 1, wherein the sacral loading attachment comprises a sacral wedge.

13. A riser system for mounting on a surgical table, the surgical table having a support surface, the riser system comprising:

one or more riser panels having a patient support surface, the riser panels mounted above and an in spaced apart relation to the support surface of the surgical table, a receiver block disposed on one of the one or more riser panels;

a sacral loading attachment disposed adjacent one of the one or more riser panels, the sacral loading attachment removably attached to the receiver block, the sacral loading attachment having a body defined in part by a plurality of elongate members extending downward along a midportion of the length of the sacral loading attachment, the plurality of elongate members having openings defined between adjacent elongate members, the openings configured to provide space for deformation of the sacral loading attachment under a load along a curve from a proximal end of the top surface of the sacral loading attachment to a distal end of the top surface, the sacral loading attachment configured to deform outwardly and downwardly along a curve with respect to the patient support surface.

14. The system set forth in claim 13, wherein at least one of the one or more riser panels include an imbedded radiological digitizer plate.

15. The system set forth in claim 13, wherein the one or more riser panels comprises a plenolic material.

16. The system set forth in claim 13, further comprising at least one pin configured for engagement with an opening in the surgical table, the at least one pin configured to support the one or more riser panels from the surgical table.

17. The system set forth in claim 13, wherein the one or more riser panels comprises carbon fiber.

* * * * *